(12) United States Patent  
Mayer Pujadas et al.

(10) Patent No.: US 9,409,441 B2  
(45) Date of Patent: Aug. 9, 2016

(54) PUSH ON PLASTIC WHEEL TRIM

(71) Applicants: Augusto Mayer Pujadas, Sant Cugat del Vallès (ES); Guillem Domínguez Santaló, Barcelona (ES)

(72) Inventors: Augusto Mayer Pujadas, Sant Cugat del Vallès (ES); Guillem Domínguez Santaló, Barcelona (ES)

(73) Assignee: ZANINI AUTO GRUP, SA, Barcelona (ES)

( * ) Notice: Subject to any disclaimer, the term of this patent is extended or adjusted under 35 U.S.C. 154(b) by 619 days.

(21) Appl. No.: 13/796,230

(22) Filed: Mar. 12, 2013

(65) Prior Publication Data

US 2014/0265532 A1    Sep. 18, 2014

(51) Int. Cl.
| | |
|---|---|
| *B60B 7/06* | (2006.01) |
| *B60B 3/16* | (2006.01) |
| *B60B 7/14* | (2006.01) |
| *F16B 37/14* | (2006.01) |
| *F16B 5/06* | (2006.01) |

(52) U.S. Cl.
CPC . *B60B 7/06* (2013.01); *B60B 3/165* (2013.01); *B60B 7/068* (2013.01); *B60B 7/14* (2013.01); *F16B 37/14* (2013.01); *F16B 5/065* (2013.01); *Y10T 29/49826* (2015.01)

(58) Field of Classification Search
CPC ............ B60B 7/12; B60B 7/14; B60B 7/066; B60B 7/04; B60B 7/08; B60B 7/068; F16B 37/0864; F16B 37/14; F16B 37/0828; F16B 37/0842; F16B 37/0857
See application file for complete search history.

(56) References Cited

U.S. PATENT DOCUMENTS

| | | | | | |
|---|---|---|---|---|---|
| 4,133,583 | A | * | 1/1979 | Spisak ........................ | 301/37.34 |
| 4,382,635 | A | * | 5/1983 | Brown et al. ............... | 301/37.35 |
| 4,998,780 | A | * | 3/1991 | Eshler et al. .............. | 301/37.375 |
| 5,181,767 | A | * | 1/1993 | Hudgins et al. .......... | 301/37.375 |
| 5,249,845 | A | * | 10/1993 | Dubost ..................... | 301/37.373 |
| 5,297,854 | A | * | 3/1994 | Nielsen et al. ........... | 301/37.373 |
| 5,667,281 | A | * | 9/1997 | Ladouceur ............... | 301/37.375 |
| 5,842,749 | A | * | 12/1998 | DiMarco ................... | 301/37.375 |
| 5,918,946 | A | * | 7/1999 | DiMarco ................... | 301/37.375 |
| 6,017,096 | A | * | 1/2000 | Russell ....................... | 301/37.36 |
| 6,030,049 | A | * | 2/2000 | Russell .................... | 301/37.375 |
| 6,070,947 | A | * | 6/2000 | Hoyle, Jr. ................. | 301/37.375 |
| 6,135,570 | A | * | 10/2000 | Wieczorek ............... | 301/37.374 |
| 6,783,189 | B1 | * | 8/2004 | Russell et al. ............. | 301/37.12 |
| 7,387,346 | B2 | * | 6/2008 | Sabanes et al. .......... | 301/37.373 |
| 7,722,128 | B2 | * | 5/2010 | Russell et al. ........... | 301/37.373 |

(Continued)

FOREIGN PATENT DOCUMENTS

| | | |
|---|---|---|
| WO | WO 2004/091935 A | 10/2004 |
| WO | WO 2004091935 A1 | 10/2004 |

*Primary Examiner* — Hau Phan  
*Assistant Examiner* — Jacob Meyer  
(74) *Attorney, Agent, or Firm* — Seth Natter; Natter & Natter

(57) ABSTRACT

A push on plastic wheel trim includes a disc and plastic lug nut caps seated in apertures formed in the disc. Each cap includes at least one axial panel having a lug nut engaging surface projecting from its inner face and at least one aperture engaging leg, having a flange projecting from its outer face. The lug nut engaging surface may comprise a partial thread segment configured to snap into the roots of external threads formed on the lug nuts or a lip which snaps over an annular lug nut flange. The caps are retained in the apertures by the leg flange engaging the inner face of the wheel cover disc and an annular cap flange which engages the outer face of the disc.

15 Claims, 4 Drawing Sheets

(56) References Cited

U.S. PATENT DOCUMENTS

| | | | |
|---|---|---|---|
| 8,469,459 B2* | 6/2013 | Lauffer | 301/37.373 |
| 2005/0082901 A1* | 4/2005 | Sabanes et al. | 301/37.372 |
| 2005/0168053 A1* | 8/2005 | Hauler | 301/37.105 |
| 2006/0261668 A1* | 11/2006 | Hauler | 301/108.1 |
| 2007/0210640 A1* | 9/2007 | Rogers | 301/37.373 |
| 2007/0278847 A1* | 12/2007 | Russell et al. | 301/37.373 |
| 2010/0072806 A1* | 3/2010 | Lauffer | 301/37.373 |
| 2011/0182697 A1* | 7/2011 | Smith | 411/433 |

* cited by examiner

PUSH ON PLASTIC WHEEL TRIM

BACKGROUND OF THE INVENTION

1. Field of the Invention

This invention relates generally to wheel trim and more particularly to a lug nut engaging retention system which resists degradation at elevated wheel temperatures.

2. Antecedents of the Invention

Plastic wheel trim have been employed for several years. Among the attributes of plastic wheel trim are resistance to water, road salt and other environmental factors, which effected corrosion in metal wheel trim.

A primary advantage of plastic wheel trim was that it was light in weight and thus did not significantly contribute to total vehicle weight. As such, the employment of plastic wheel trim was one of several factors contributing to increased vehicle mileage efficiency.

Further, plastic wheel trim was moldable into a variety of attractive configurations and was susceptible to any of a variety of outer finishes including metal plating and painting. A significant problem with respect to plastic wheel trim was obtaining satisfactory retention to the wheel. A variety of systems have been proposed for retaining plastic wheel trim with varying degrees of success.

Wheel trim have been secured to the outer wheel weight rim of a wheel, however, metal barbs were required which had a tendency to scratch the wheel and induce wheel corrosion.

It has been found that plastic wheel trim retention systems which engage a wheel lug nut have proven most effective. In U.S. Pat. No. 4,998,780, issued to Martin E. Russell, et al., disclosed a wheel trim retention comprised a series of plastic caps which were captured in apertures extending through the wheel trim. The caps included internal threads which engaged specially configured wheel lug nuts having mating external threads.

While the retention system disclosed in U.S. Pat. No. 4,998,780 proved to be effective in securely retaining the wheel trim, vehicle owners found that the removal and mounting of the wheel trim to a vehicle wheel was not a simple task, since a lug nut wrench was required to rotate the caps. Further, because of elevated operating temperatures generated by vehicle braking systems, plastics having elevated softening temperatures were required. With elevated temperatures, the face of the wheel cover softened, warped and lost its preload, resulting in disengagement of the wheel cover periphery from the wheel rim and concomitant rattling, squeaking and other noises. One approach toward resolving this problem was to increase the thickness of the wheel cover face, increasing both weight and cost.

Push on retention systems have been preferred because of their simplicity in mounting and dismounting the wheel trim, however, the engagement between a plastic retention and a lug nut suffered significant problems because wheel heat, generated by the vehicle braking system, resulted in elevated temperatures not only of the wheel disc, rotor or brake drum, but additionally, the lugs and the lug nuts. The plastic retainers which were in contact with the lug nuts were thus subject to elevated temperatures, which resulted in degraded retentivity and the loss of the wheel trim on a highway, freeway or other roadway and concomitant hazards to motorists attempting to avoid the road debris.

While attempts have been made to employ metal socket clips to grip lug nuts, as exemplified in U.S. Pat. No. 4,133,583 and U.S. Pat. No. 5,297,854, such approach resulted in increased manufacturing costs. Difficulty was often encountered in mounting the wheel trim to the wheel because the metal clips did not provide sufficient guidance for centering the wheel trim on the wheel, with the wheel trim having a tendency to float. Unless costly alloys were employed, the clips were subject to corrosion from water and road salt which was accelerated by the elevated temperatures of the lug nuts.

SUMMARY OF THE INVENTION

A push on plastic wheel trim includes plastic lug nut caps seated in apertures formed through the disc of the wheel trim. Each cap includes at least one arcuate panel having a lug nut engaging surface projecting from its inner face and at least one aperture engaging concentric arcuate leg, having a flange projecting from its outer face.

The lug nut engaging surface may comprise a partial thread segment configured to snap into the roots of external threads formed on the lug nuts or a lip which snaps over a lug nut flange, in the event flanged lug nuts are employed. The caps are retained in the apertures by the leg flange engaging the inner face of the wheel cover disc and an annular flange which engages the outer face of the wheel cove disc. A metal ring engages the outer faces of the panel and the inner faces of the leg to urge the lug nut engaging surface of the panel against the lug nuts and to urge the leg flange against the inner faces of the disc.

From the foregoing compendium, it will be appreciated that it is an aspect of the present invention to provide a push on retention system for plastic wheel trim which is not subject to the disadvantages of the antecedents of the invention aforementioned.

A feature of the present invention is to provide a push on retention system for plastic wheel trim which maintains high retentivity in the presence of elevated temperatures.

A consideration of the present invention is to provide a push on retention system for plastic wheel trim of the general character described which is relatively low in cost.

Another aspect of the present invention is to provide a push on retention system for plastic wheel trim of the general character described which avoids metal-to-metal contact.

A still further feature of the present invention is to provide a push on retention system for plastic wheel trim of the general character described which includes freely rotatable lug nut engaging caps.

An additional consideration of the present invention is to provide a push on retention system for plastic wheel trim of the general character described which is well adapted for economical mass production fabrication.

A further aspect of the present invention is to provide a plastic wheel trim of the general character described which is capable of being affixed to and removed from a wheel without the use of tools.

Another feature of the present invention is to provide a push on retention system for plastic wheel trim which is sturdy and durable.

A still further consideration of the present invention is to provide a push on retention system for plastic wheel trim of the general character described which facilitates simple mounting and removal of the wheel trim.

Yet another feature of the present invention is to provide a push on retention system for plastic wheel trim of the general character described which is well suited for implementation with thermoplastic molded wheel trim having reduced thickness.

Other aspects, features and considerations of the present invention in part will be obvious and in part will be pointed out hereinafter.

With these ends in view, the invention finds embodiment in the certain combinations of elements, arrangements of parts and series of steps by which the aforesaid aspects, features and considerations and certain other aspects, features and considerations are attained, all with reference to the accompanying drawings and the scope of which will be more particularly pointed out and indicated in the appended claims.

BRIEF DESCRIPTION OF THE DRAWINGS

In the accompanying drawings, in which is shown one of the various possible exemplary embodiments of the invention.

DESCRIPTION OF THE PREFERRED EMBODIMENTS

Figure 1:
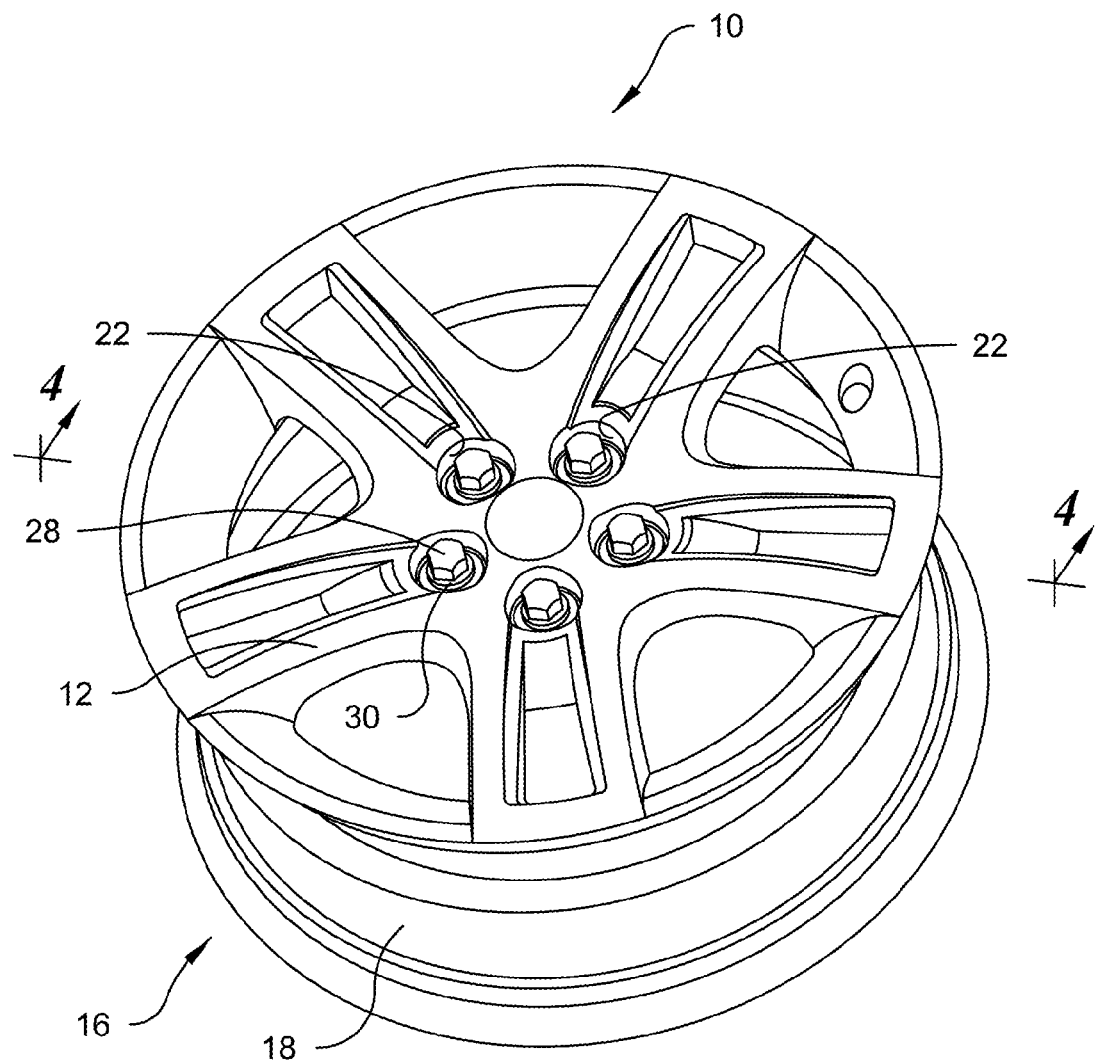
FIG. 1 is an isometric view of a wheel having push on wheel trim mounted thereto in accordance with the present invention, with a tire, axle, rotor and wheel lugs omitted for clarity of illustration.

Referring now in detail to the drawings, the reference numeral 10 denotes generally a push on plastic wheel trim, e.g. wheel cover, constructed in accordance with and embodying the present invention. The wheel trim 10 includes a disc 12, configured to substantially cover the axially outer face 14 of a wheel 16 having a rim 18.

Pursuant to the invention, the disc 12 includes a plurality of apertures 20 formed at the bases of recesses or wells 22, with the apertures 20 arrayed for registration with wheel lugs 24 and lug nuts 26. A like plurality of lug nut caps 28 are captively retained within the apertures 20.

The lug nut caps 28 include an annular peripheral flange 30 which overlies the axially outer face of the disc wells surrounding the apertures 20. The lug nut caps 28 are provided with a plurality of equidistantly spaced legs 32 extending axially inwardly from the flange 30, with each leg 32 including a radially outwardly projecting flange 34 having an abutment face 36 which engages the axially inner face of the disc 12 surrounding the apertures 20 so as to capture the cap 28 between the peripheral flange 30 and the abutment face 36 of the leg flanges 34. Axial movement of the disc 12 relative to the caps 28 is thus restricted, while the caps are permitted to rotate relative to the disc 12.

Figure 2:
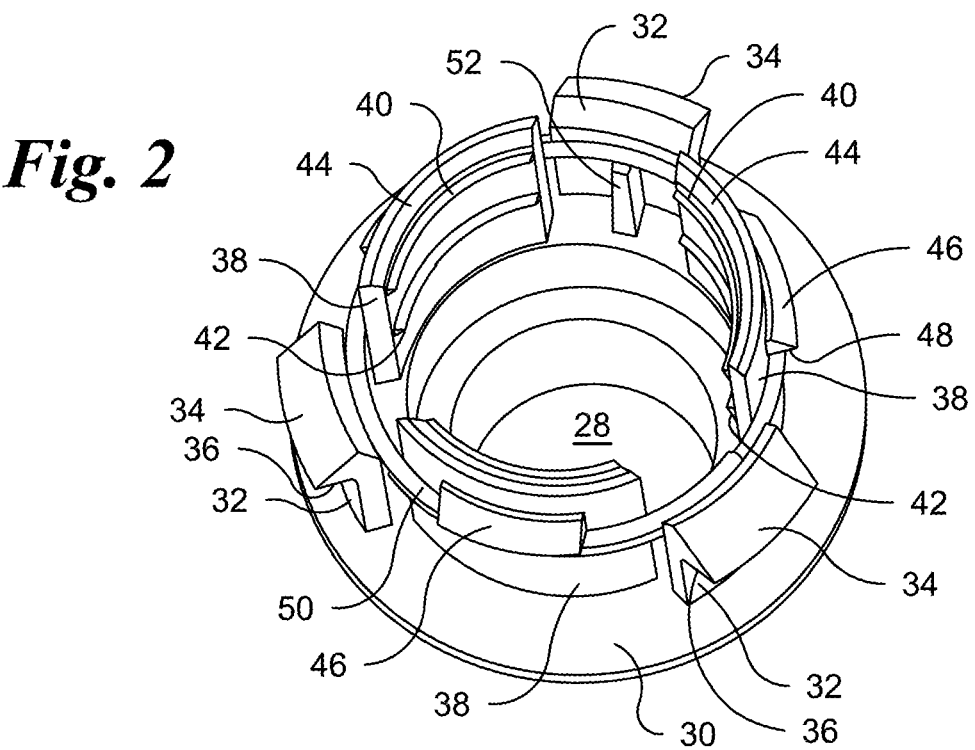
FIG. 2 is an enlarged scale isometric axially inner view of a lug nut cap in accordance with the present invention showing partial thread segments for engagement with externally threaded portions of a lug nut.
Figure 3:
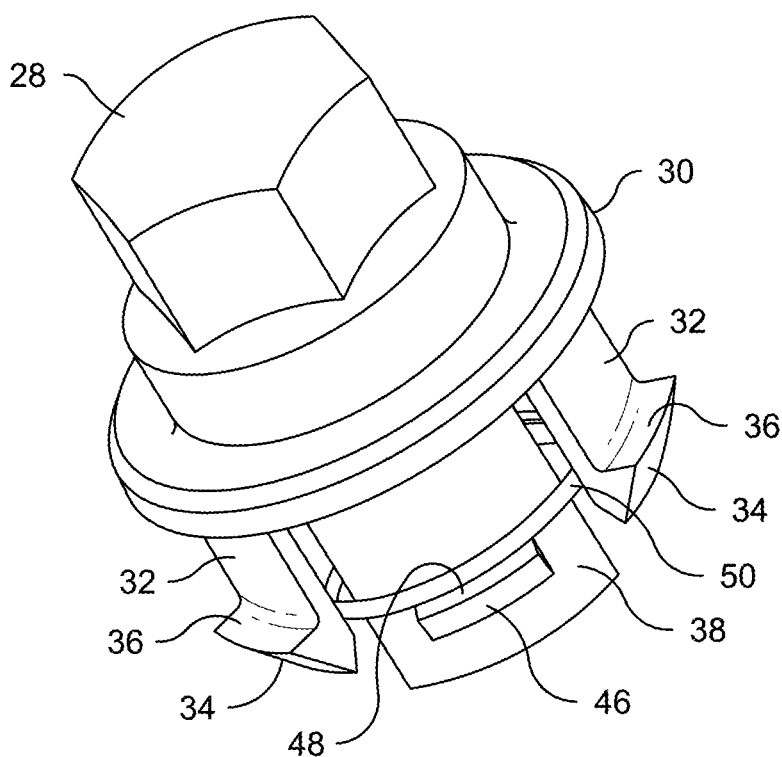
FIG. 3 is an enlarged scale isometric view of the of the lug nut cap showing flanges for captively retaining the cap within an aperture of the wheel trim.

With reference now to FIG. 2, it should be noted that positioned between the legs 32 and spaced radially inwardly from the legs 32 are concentric axially inwardly extending arcuate panels 38. Extending radially inwardly from the inner face of each panel 38 are a plurality of axially spaced partial thread segments 40, 42, each dimensioned to mate with the external threads of the lug nut 26.

The axially inner ends of the panels 38 include a chamfer 44 to assist in alignment of the caps 28 with the lug nuts 26. The radially outer surfaces of the panels 38 include a radially outwardly extending flange 46 having an abutment face 48. A spring wire ring 50 is positioned in engagement with the radially outer surface of the panels 38 and the radially inner surface of the legs 32. The ring 50 is fixed against axial movement between the abutment face 48 and a radially inwardly extending rib 52 formed on the inner surface of the leg 32.

The spring wire ring 50 serves to prevent the legs 32 from deflecting radially inwardly after the caps 28 are seated within the apertures 20 so that the caps 28 will not move axially relative to the disc 12 and also serves to maintain the thread fragment 40, 42 in tight engagement with the lug nut threads to preclude axial movement between the lug nuts and the caps, thus retaining the disc 12 in its mounted position.

To mount the wheel trim 10 to a vehicle wheel 16, the disc 12 is held generally parallel to the outer face 14 and the lug nut caps 28 are registered with the lug nuts 26. The disc 12 is then manually pushed against the wheel until the outer edge of the disc 12 seats against the wheel rim flange. As the thread segments 40, 42 engage and pass over the external threads of the lug nut, the panels 38 sequentially flex radially outward and inward, such that the thread segments pass over the crests of the lug nut threads and snap back into the roots of the lug nut threads. Engagement between the ring 50 and the panels 38 assures that the thread segment or segments are tightly seated within a thread root for proper retention of the disc 12. Engagement between the ring 50 and the legs 32 assures that the abutment flanges 36 will prevent the lug nut caps 28 from pushing through their apertures 20 when mounting the trim 10. The trim 10 can be removed from the wheel 16 by grasping the outer periphery of then disc and pulling the disc axially outwardly away from the wheel.

Figure 4:
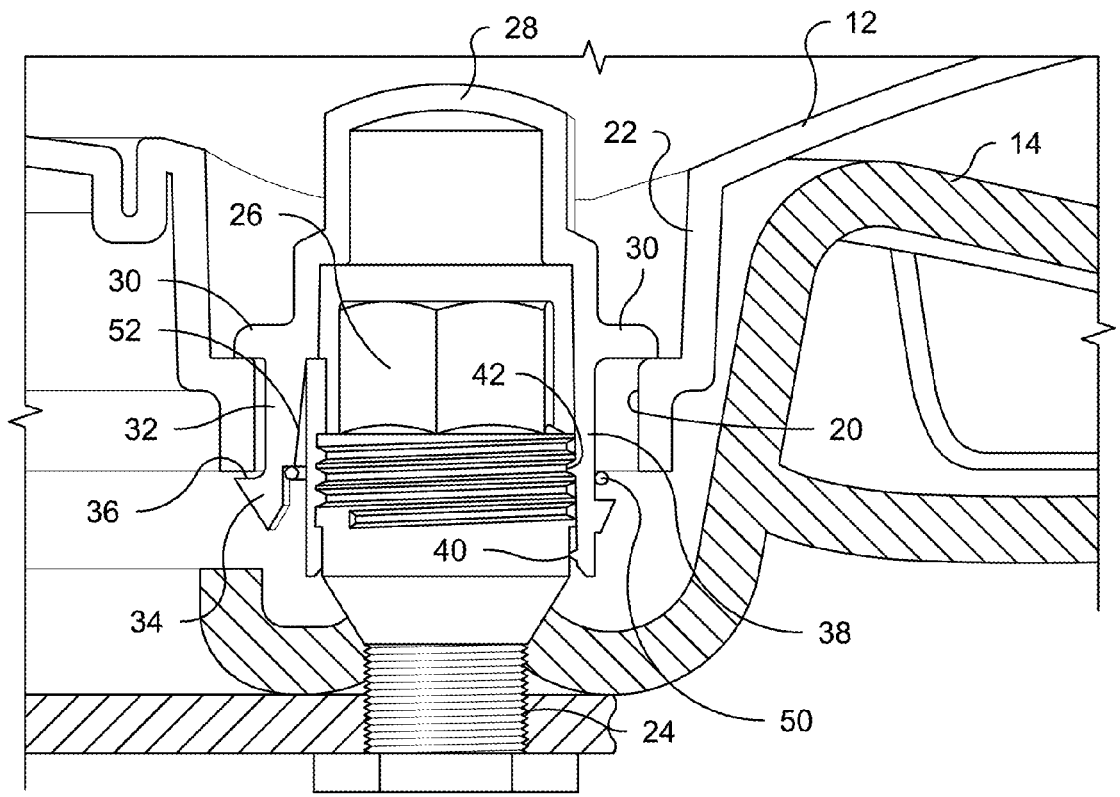
FIG. 4 is an enlarged scale fragmentary sectional view through the wheel trim and the wheel, taken substantially along the plane 4-4 of FIG. 1 and through a lug nut cap and showing the engagement between a partial thread segment and the externally threaded portion of a lug nut.

As illustrated in FIG. 4, one or more thread segments of each panel 38 engage the lug nut threads. The exemplary segments 40, 42 are preferably axially spaced from one another such that a range of lug nut positions and wheel configurations may be accommodated.

It should be appreciated that pursuant to the invention, the disc 12 may be fabricated of a relatively low softening temperature thermoplastic and need not be thick, since no preload is required. The nut caps 28, however, are preferably fabricated of a high softening temperature plastic and serve as a heat insulating barrier between the lug nuts and the disc.

Figure 5:
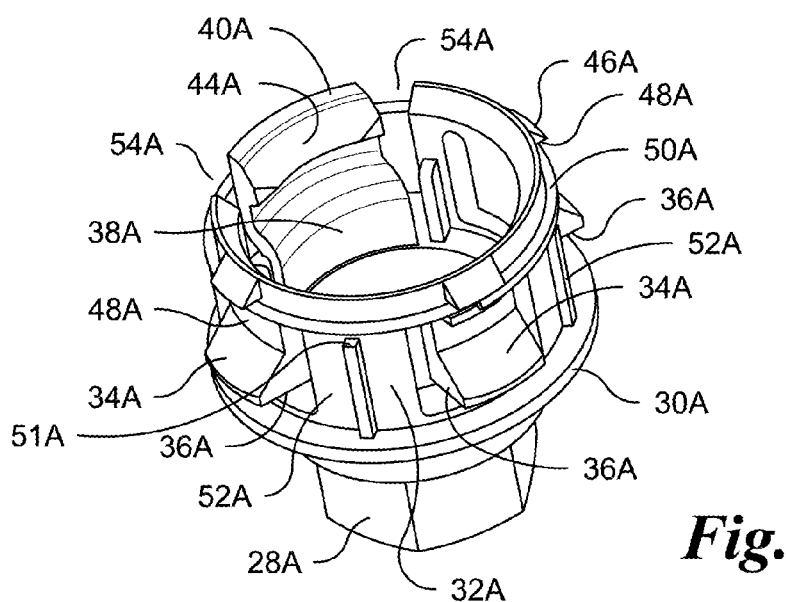
FIG. 5 is an enlarged scale isometric view of an alternate embodiment of the lug nut cap showing a lip which snaps over the flange of a flanged lug nut.
Figure 6:
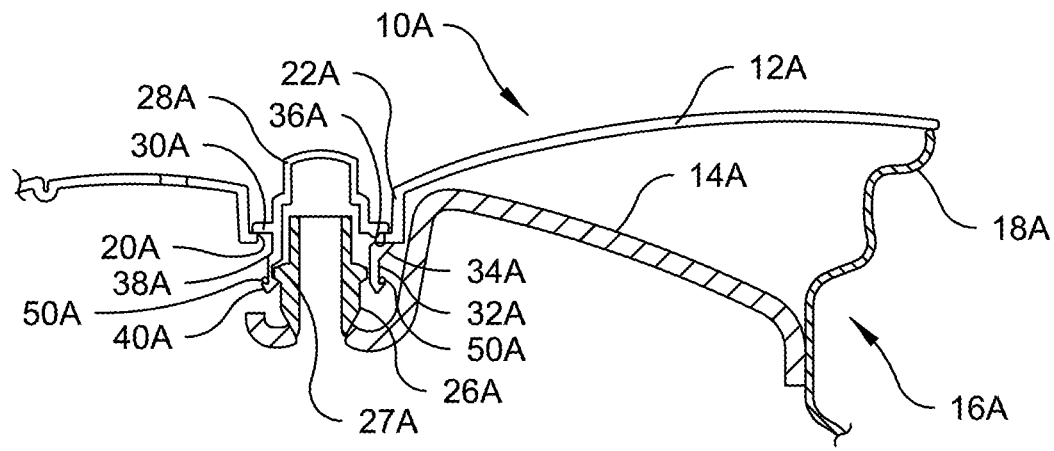
FIG. 6 is a fragmentary sectional view through the wheel trim and the wheel, similar to FIG. 4, but through the alternate embodiment lug nut cap and showing the engagement between a lip and the axially interior surface of the lug nut flange.

With reference now to FIG. 5 and FIG. 6, wherein an alternate embodiment to the invention is shown, like numerals will be employed to describe like components of the previous embodiment, however bearing the suffix A.

An alternate embodiment of a wheel trim 10A includes a disc 12A configured to substantially cover the axially outer face 14A of a wheel 16A having a rim 18A.

Pursuant to the invention, the disc 12A includes a plurality of apertures 20A formed at the bases of recesses or wells 22A, with the apertures 20A arrayed for registration with wheel lug nuts 26A having annular peripheral flanges 27A. A like plurality of lug nut caps 28A are captively retained within the plurality of apertures 20A.

The lug nut caps 28A include an annular peripheral flange 30A which overlies the axially outer face of the disc wells surrounding the apertures 20A. The lug nut caps 28A are provided with a cylindrical skirt 32A extending axially inwardly from the flange 30A. The skirt 32A includes radially outwardly projecting flanges 34A having abutment faces 36A which engage the axially inner face of the disc 12A surrounding the apertures 20A so as to capture the cap 28A between the peripheral flange 30A and abutment faces 36A of the flanges 34A. Axial movement of the disc 12A relative to the caps 28A is thus restricted, while the caps are permitted to rotate relative to the disc 12A.

With reference now to FIG. 5, it should be noted that the skirt 32A is configured with a gap 54A. Registered with the gap 54A and spaced radially inwardly from the skirt 32A is a concentric axially inwardly extending arcuate panel 38A. Extending radially inwardly from the inner face of the panel 38A at the axially inner end thereof is a lip 40A. The lip 40A is dimensioned to engage a portion of the lug nut 26A which is spaced axially inwardly of the annular flange 27A, as illustrated in FIG. 6.

The lip 40A includes a chamfer 44A to assist in alignment of the caps 28A with the lug nuts 26A. Spaced axially inwardly from each flange 34A on the skirt 32A is a radially outwardly extending flange 46A having an abutment face 48A. A spring wire ring 50A is positioned in engagement with the radially outer surface of the skirt 32A and panel 38A. The ring 50A is fixed against axial movement between the abutment face 48A and an abutment stop 51A of a radially outwardly extending rib 52A formed on the skirt 32A.

To mount the wheel trim 10A to the vehicle wheel 16A, the disc 12A is held generally parallel to the outer face 14A and the lug nut caps 28A are registered with the lug nuts 26A. The disc 12A is then manually pushed against the wheel until the outer edge of the disc 12A seats against the wheel rim flange. As the lip 40A engages the annular flange 27A of the lug nut 26A, the panel 38A flexes radially outward guided by the chamfer 44A, such that the lip passes over the annular flange 27A and snaps back against the lug nut portion spaced axially inwardly of the flange 27A.

Figure 7:
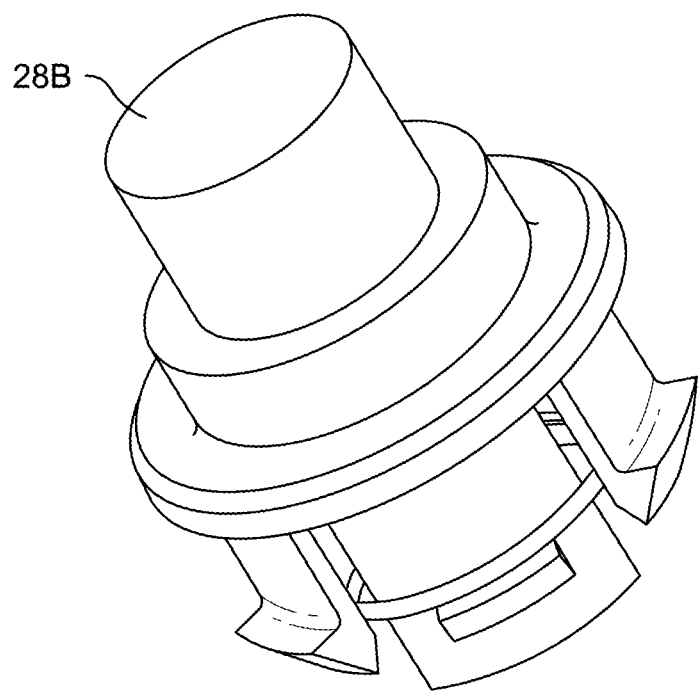
FIG. 7 is an enlarged scale isometric view of an alternate lug nut cap, wherein the cap does not include a hexagonal configuration in simulation of a lug nut.

Rotation of the lug nut caps after the trim has been mounted will not result in loosening or removal of the trim. In order to discourage rotation of the caps, the caps are preferably contoured with a hexagonal configuration larger than that of the lug nuts such that the lug nut wrench supplied with a vehicle will not fit. Alternatively, the caps can be contoured without a hexagonal nut configuration, such as the lug nut cap 28B, illustrated in FIG. 7.

Thus it will be seen that there is provided a push on plastic wheel trim which achieves the various aspects, features and considerations of the present invention and which is well suited to meet the conditions of practical usage.

As various possible further embodiments might be made of the present invention and various changes might be made in the illustrative embodiments above set forth without departing from the spirit of the invention, it is to be understood that all matter herein described or shown in the accompanying drawings is to be interpreted as illustrative and not in a limiting sense.

Having thus described the invention, there is claimed as new and desired to be secured by Letters Patent:

1. A plastic wheel trim configured for push on engagement with wheel lug nuts, the lug nuts having a projection extending radially outwardly, the wheel trim comprising a disc having a plurality of apertures arrayed for registration with the wheel lug nuts, the apertures extending completely through the disc, the wheel trim further including a plurality of plastic lug nut caps seated in and covering the apertures, each lug nut cap having an annular flange overlying an outer face of the disc surrounding the aperture and at least one leg extending axially inward, the leg including a flange projecting radially outward, the leg flange engaging an inner face of the disc adjacent the aperture, each lug nut cap having at least one panel extending axially inward, the at least one panel including a lug nut engaging surface configured for snap engagement with the lug nut projection when the wheel trim is pushed toward the wheel and the lug nut caps are advanced axially over and cover the lug nuts, each lug nut cap further including a concentric array of spaced panels and spaced legs, the legs being positioned radially outwardly from the panels, each lug nut cap further including a ring, the ring engaging a radially inner surface of each leg and a radially outer surface of each panel whereby the lug nut engaging surfaces are urged toward the lug nuts and the leg flanges are urged radially outwardly so as to assure engagement with the inner face of the disc and preclude the lug nut caps from axial movement relative to the disc when the wheel trim is being mounted to the wheel.

2. A plastic wheel trim as constructed in accordance with claim 1 wherein the lug nut projection comprises a thread and the lug nut engaging surface comprises a fragmentary thread segment.

3. A plastic wheel trim as constructed in accordance with claim 2 wherein the lug nut engaging surface comprises a plurality of fragmentary thread segments.

4. A plastic wheel trim as constructed in accordance with claim 1 wherein the disc is formed of a plastic having a lower softening temperature than the plastic of the lug nut caps.

5. A plastic wheel trim as constructed in accordance with claim 1 wherein the lug nuts are configured with a surface having a pattern for engagement by a lug nut wrench and an axially outer surface of the lug nut caps is configured with a pattern different from that of the lug nuts.

6. A plastic wheel trim as constructed in accordance with claim 1 wherein an outer surface of the panels include a radially outward projecting flange and a radially inner surface of the legs include a radially inward projecting rib, the ring being axially positioned between the radially outward projecting flange and the radially inward projecting rib, whereby the ring is restrained against axial movement.

7. A method of mounting a plastic wheel trim having a disc to a wheel secured to a vehicle with an array of lug nuts, the lug nuts having a radial projection, the method comprising the steps of:
  a) providing an array of apertures through the disc, the apertures being registered with the array of lug nuts,
  b) providing a plurality of lug nut caps configured for axial placement over the lug nuts, each lug nut cap being provided with an annular flange, a concentric array of spaced panels extending axially inwardly and a plurality of legs extending axially inwardly, each leg including a leg flange projecting radially outwardly, at least one panel having a radially inwardly projecting lug nut engaging surface,
  c) covering each aperture with a lug nut cap,
  d) securing the lug nut caps in each aperture and restraining axial movement of the lug nut caps relative to the disc by:
    i) overlying the outer face of the disc surrounding each aperture with the annular flange and
    ii) engaging the inner face of the disc adjacent the aperture with the leg flange,
  e) registering the lug nut caps with the lug nuts, f) engaging the panel lug nut engaging surface with the projection by pushing the disc against the wheel and:
   i) flexing the panel radially outwardly when the engaging surface contacts the projection and
   ii) snapping the panel radially inwardly after the engaging surface passes the projection, g) positioning the legs radially outwardly from the panels, h) providing a ring, and i) engaging a radially inner surface of each leg and a radially outer surface of each panel with the ring and employing the ring to urge the panel lug nut engaging surfaces radially inwardly toward the lug nuts and the leg flanges radially outwardly.

8. A method of mounting a plastic wheel trim having a disc to a wheel in accordance with claim 7 further including the steps of fabricating the disc and the lug nuts of different plastics, the plastic from which the lug nuts are fabricated having a higher softening temperature than the plastic from which the disc is fabricated.

9. A method of mounting a plastic wheel trim having a disc to a wheel in accordance with claim 7 wherein step f) is terminated when the outer periphery of the disc contacts the wheel rim without exerting stress on the disc.

10. A method of removing a plastic wheel trim mounted to a wheel in accordance with claim 7 comprising the further steps of grasping the periphery of the disc with one's hands and pulling the disc away from the wheel.

11. A plastic wheel trim configured for push on engagement with wheel lug nuts, the lug nuts having a projection extending radially outwardly, the wheel trim comprising a disc having a plurality of apertures arrayed for registration with the wheel lug nuts, the apertures extending completely through the disc, the wheel trim further including a plurality of plastic lug nut caps seated in the apertures, each lug nut cap including an annular flange overlying an outer face of the disc surrounding each aperture, each lug nut cap having a plurality of concentrically arrayed panels extending axially inward, at least one panel including a lug nut engaging surface configured for snap engagement with the lug nut projection when the wheel trim is pushed toward the wheel and the lug nut caps are advanced axially over and cover the lug nuts, the lug nut engaging surface comprising a fragmentary thread segment and the lug nut projection comprising a thread, each lug nut cap further including a concentric array of legs extending axially inward, the legs being positioned radially outward from the panels, each leg having a flange projecting radially outward, the leg flange engaging an inner face of the disc adjacent the aperture whereby axial movement of the lug nut caps relative to the disc is restrained.

12. A plastic wheel trim as constructed in accordance with claim 11 wherein the disc is formed of a plastic having a lower softening temperature than the plastic of the lug nut caps.

13. A plastic wheel trim as constructed in accordance with claim 11 further including a ring, the ring engaging a radially inner surface of each leg and a radially outer surface of each panel, whereby the panel surfaces are urged toward the lug nuts and the leg flanges are urged radially outwardly so as to assure engagement with the inner face of the disc and preclude the lug nut caps from axial movement relative to the disc when the wheel trim is being mounted to the wheel.

14. A plastic wheel trim as constructed in accordance with claim 11 wherein the lug nuts are configured with a surface having a pattern for engagement by a lug nut wrench and an axially outer surface of the lug nut caps is configured with a pattern different from that of the lug nuts.

15. A plastic wheel trim as constructed in accordance with claim 13 wherein an outer surface of the panels include a radially outward projecting flange and a radially inner surface of the legs include a radially inward projecting rib, the ring being axially positioned between the radially outward projecting flange and the radially inward projecting rib, whereby the ring is restrained against axial movement.

\* \* \* \* \*